United States Patent
Elliott et al.

(10) Patent No.: US 8,111,272 B2
(45) Date of Patent: Feb. 7, 2012

(54) METHOD FOR COMPENSATING MISALIGNMENT ERRORS IN ELECTROPHOTOGRAPHIC DEVICE

(75) Inventors: Delbert Lester Elliott, Georgetown, KY (US); John Lemaster, Lexington, KY (US); Mark Andrew Omelchenko, Lexington, KY (US); David Anthony Schneider, Lexington, KY (US); Thad Carlton Switzer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 370 days.

(21) Appl. No.: 12/512,626

(22) Filed: Jul. 30, 2009

(65) Prior Publication Data

US 2011/0026550 A1 Feb. 3, 2011

(51) Int. Cl.
*B41J 2/385* (2006.01)
*B41J 2/47* (2006.01)
*B41J 2/435* (2006.01)

(52) U.S. Cl. .................. 347/116; 347/235; 347/250

(58) Field of Classification Search .................. 347/116, 347/114, 117, 229, 234, 235, 248, 250; 358/504; 250/208.1
See application file for complete search history.

(56) References Cited

U.S. PATENT DOCUMENTS

| 2002/0167583 A1* | 11/2002 | Binford et al. ................. 347/234 |
| 2006/0114309 A1* | 6/2006 | Bush ............................. 347/116 |
| 2006/0226338 A1* | 10/2006 | Tojima et al. ............. 250/208.1 |
| 2007/0058221 A1* | 3/2007 | Heink et al. .................. 358/504 |

* cited by examiner

*Primary Examiner* — Kristal Feggins (57) ABSTRACT

A method for compensating misalignment errors associated with a laser beam in an electrophotographic (EP) device is disclosed. A first value and a second value of a time-of-flight of the laser beam are determined. The second value of the time-of-flight is associated with a current value of SOS time and EOS time of the laser beam. The second value of the time-of-flight of the laser beam is compared with the first value of the time-of-flight. A duty cycle of a fuser of the EP device is monitored. An average value of the duty cycle of the fuser for a predetermined time period is determined. One or more alignment conditions of the laser beam are adjusted based on at least one of the comparisons of the second value and the first value of the time-of-flight of the laser beam, and the determined average value of the duty cycle of the fuser.

20 Claims, 6 Drawing Sheets

METHOD FOR COMPENSATING MISALIGNMENT ERRORS IN ELECTROPHOTOGRAPHIC DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The disclosure relates generally to electrophotograhic (EP) devices, and, more particularly, to compensating misalignment errors in EP devices.

2. Description of the Related Art

Printing devices, such as electrophotographic (EP) devices, are widely used in offices, homes and business enterprises for printing information on media sheets, such as papers, transparencies, envelopes, and the like. EP devices such as EP printers operate by generating an image pattern of information to be printed, and subsequently transferring toner particles onto a media sheet based on the generated image pattern to produce an image of the information on the media sheet. The image of the information transferred onto the media sheet may be adhered onto the media sheet by application of heat and pressure.

The information transferred onto the media sheet may be black-and-white information or colored information. Currently, various multicolor EP printers are available that print colored images of the information onto the media sheet. The multicolor EP printers include four toner cartridges for carrying four different colored toners, namely, cyan, magenta, yellow and black (which colors may hereinafter be referred to as "CMYB"). The four colors may be combined into varying proportions to generate a full spectrum of colors. Typically, each of the four colors may be deposited on the media sheet to form sub-images. In a single-pass multicolor EP printer, sub-images derived from four different colors must lie precisely aligned with respect to each other.

A single pass EP printer includes an imaging assembly for printing information onto the media sheet. The imaging assembly includes a laser beam source, a photoconductive member such as a photoconductive drum, and a toner cartridge, for each of the four colors. Moreover, the imaging assembly includes a fuser. The photoconductive member is typically homogenously charged. Based on the information to be printed on the media sheet, each of the laser beam sources focus a light beam onto the photoconductive drum to create a charge pattern on the photoconductive drum. Toner particles are electrostatically attracted to the charge pattern to form a latent image of the information, which may then be transferred on to the media sheet to form an image onto the media sheet.

The image formed on the media sheet includes unfused toner particles that need to be fused, thereby forcing the unfused toner particles to adhere to the media sheet. The media sheet having unfused toner particles deposited thereon may be advanced towards the fuser for fusing the toner particles onto the media sheet. The fuser may typically include a heater device for applying heat onto the unfused toner particles for permanently fixing the image onto the media sheet. The high temperature melts the toner particles and allows the toner particles to adhere to the media sheet. However, the high temperature produced by the fuser may also result in thermally induced expansion and contraction of optical components, such as lens elements in the EP printer, thereby changing refractive indices thereof. The variation in refractive indices of the optical components may cause process and/or scan direction shifts in a scan path of the laser beam, relative to an original scan path of the laser beam. The process and/or direction shifts have the effect of causing misalignment errors in the single-pass multicolor EP printer. Further, due to heating of the optical components, the laser beam's time-of-flight also gets changed, thereby affecting color-to-color registration in the single-pass multicolor EP printer.

Currently available EP printers employ sensors for measuring the process/scan direction shifts in the path of the laser beam. The sensors detect a Start-of-scan (SOS) time and an End-of-scan (EOS) time of the laser beam for determining time-of-flight of the laser beam. The EP printer is calibrated to shift the color-to-color registration (hereinafter referred to as registration correction) as a function of the time-of-flight of the laser beam for adjusting alignment thereof. However, this method of calibrating the multicolor EP printer may still cause errors in determining registration correction since the method is based on the assumption that the heat produced in the EP printer affects only the optical components. Typically, the heat produced in the EP printer also affects various other components, such as distortion of a printhead housing, and/or mounting location of the sensors that are used to generate the SOS time and the EOS time. The distortion of the printhead housing may be non-linear, thereby affecting the lens' position and subsequently altering the position of the SOS and the EOS sensors. The alteration of the position of the SOS and the EOS sensors results in misregistration errors in the EP printer.

Alternative methods available in prior art for calibrating the EP printer include measuring registration correction as a function of temperature of a laser printhead. Specifically, the temperature of the laser printhead is sensed using a thermistor, located within, or near the laser printhead. The registration correction is characterized as a function of thermistor readings, and then a response is assumed to be constant over a population of EP printers. Using this method, the registration correction is determined as a function of the change in temperature, using a characterized relationship, and assuming a linear response with temperature. However, this assumption of the linear response with temperature may further cause errors in determination of registration corrections, since the temperature rise sensed by the thermistor may be due to multiple input sources that may affect the registration correction in various ways. Moreover, registration response to heat may also depend on the rate of heat entering or leaving the EP printer.

Based on the foregoing, there is a need for compensating misalignment errors in EP devices by appropriate means taking into consideration various heat generating sources in the EP devices.

SUMMARY OF THE DISCLOSURE

In view of the foregoing disadvantages inherent in the prior art, the general purpose of the present disclosure is to provide a method for compensating misalignment errors in EP devices, to include all the advantages of the prior art, and to overcome the drawbacks inherent therein.

Therefore, in one aspect, the present disclosure provides a method for compensating misalignment errors associated with a laser beam in an electrophotographic (EP) device, such as an EP printer. A first value of a time-of-flight of the laser beam is determined. The first value of time-of flight is associated with a first value of a start-of-scan (SOS) time and a first value of an end-of-scan (EOS) time of the laser beam. Further, a second value of the time-of-flight of the laser beam is determined. The second value of the time-of-flight is associated with a current value of the SOS time and a current value of the EOS time of the laser beam. The second value of the time-of-flight of the laser beam is compared with the first value of the time-of-flight of the laser beam. Further, a duty cycle of a fuser of the EP device is monitored. The duty cycle of the fuser is associated with an 'on-time' of the fuser over a first predetermined time interval. An average value of the duty cycle of the fuser for a predetermined time period is determined. Thereafter, one or more alignment conditions of the laser beam are adjusted based on at least one of the comparison of the second value of the time-of-flight and the first value of the time-of-flight of the laser beam, and the determined average value of the duty cycle of the fuser.

In another aspect, the present disclosure provides a computer program product embodied on a computer readable medium for compensating misalignment errors associated with a laser beam in an electrophotographic (EP) device. The computer program product comprises a program module comprising instructions for determining a first value of a time-of-flight of the laser beam. The first value of time-of-flight is associated with a first value of a start-of-scan (SOS) time and a first value of an end-of-scan (EOS) time of the laser beam. Further, the instructions include instructions for determining a second value of the time-of-flight of the laser beam. The second value of the time-of-flight is associated with a current value of the SOS time and a current value of the EOS time of the laser beam. Furthermore, the instructions include instructions for comparing the second value of the time-of-flight of the laser beam with the first value of the time-of-flight of the laser beam. Moreover, the instructions include instructions for monitoring a duty cycle of a fuser of the EP device. The duty cycle is associated with an 'on-time' of the fuser over a first predetermined time interval. Thereafter, the instructions include instructions for determining an average value of the duty cycle of the fuser for a predetermined time period. Also, the instructions include instructions for adjusting one or more alignment conditions of the laser beam based on at least one of the comparison of the second value of the time-of-flight and the first value of the time-of-flight of the laser beam, and the determined average value of the duty cycle of the fuser.

Adjusting the one or more alignment conditions of the laser beam compensates for the misalignment errors of the laser beam in the EP device. The fuser may produce a substantial amount of heat in the EP device which affects the one or more alignment conditions of the laser beam. Accordingly, in the present disclosure, the average value of the duty cycle of the fuser may be determined and compared with a second threshold value for compensating the misalignment errors associated with a laser beam in the EP device. Further, due to temperature rise in the EP device, temperature of optical components, such as lenses may increase, thereby affecting the refractive index of the optical components, which in turn affects the time-of-flight of the laser beam. Accordingly, in the present disclosure, a current value of the time-of-flight of the laser beam may be determined and compared with a first value of the time-of-flight for adjusting one or more alignment conditions of the laser beam which in turn compensates for the misalignment errors of the laser beam.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the disclosure taken in conjunction with the accompanying drawings, wherein.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the term "coupled," and variations thereof herein are used broadly and encompass direct and indirect couplings. In addition, the term "coupled" and variations thereof are not restricted to physical or mechanical couplings.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software. As such, it should be noted that a plurality of hardware and software-based devices, as well as a plurality of different structural components may be utilized to implement the present disclosure. Furthermore, and as described in subsequent paragraphs, the specific mechanical configurations illustrated in the drawings are intended to exemplify embodiments of the present disclosure and that other alternative mechanical configurations are possible.

The present disclosure provides a method and a computer program product for compensating misalignment errors associated with a laser beam in an EP device. The misalignment errors in the EP device are caused due to excessive heating of a printhead housing, optical components, such as lenses, and mountings of optical components. A major source of heating in the EP device is a fuser. Accordingly, the present disclosure discloses a method of determining a change in values of fuser duty cycle and a time-of-flight of the laser beam with time, and calibrating the EP device based on said determination. The calibration of the EP device may be done by adjusting one or more alignment conditions of the EP device. The calibration of the EP device compensates for the misalignment errors associated therewith.

Figure 1:
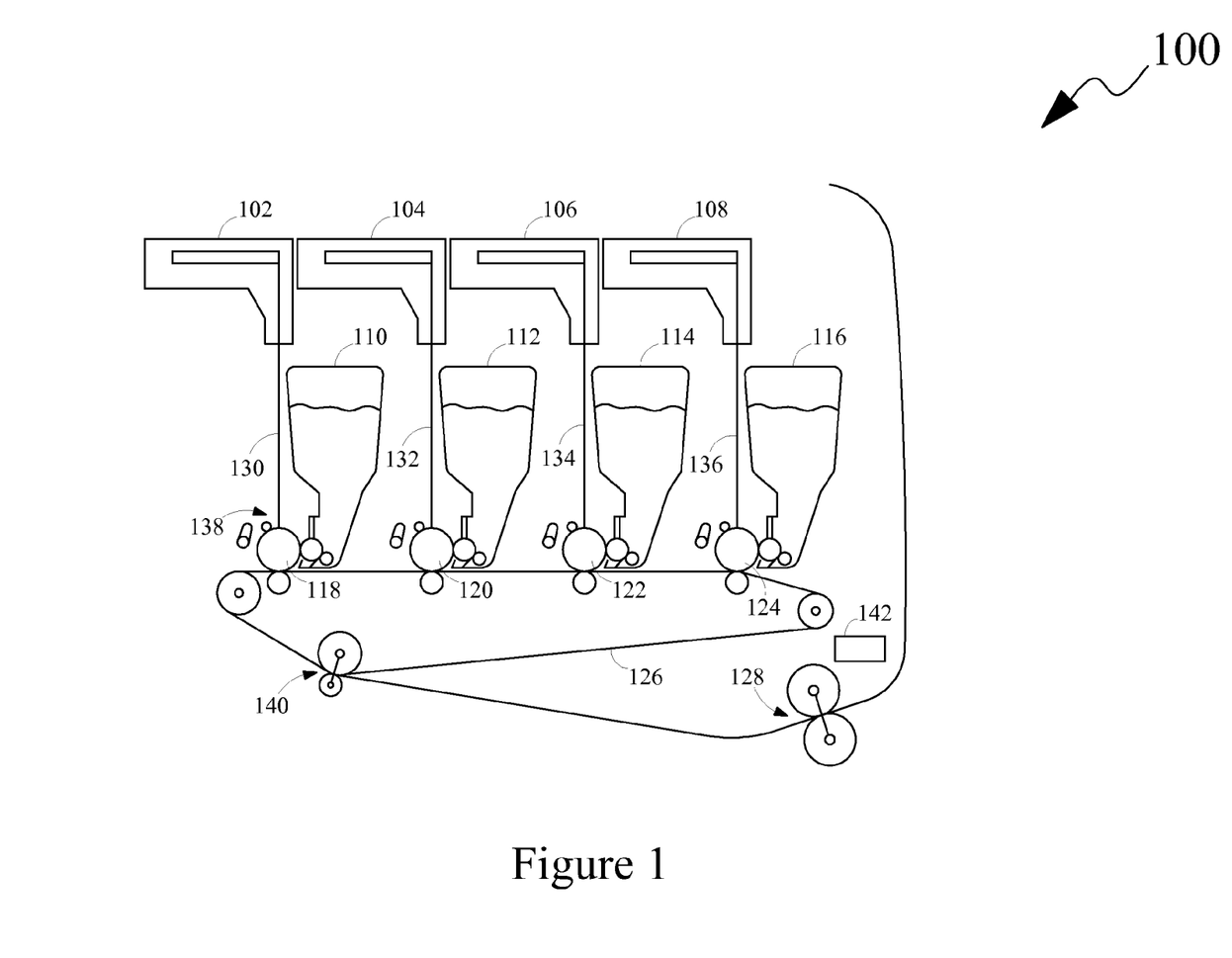
FIG. 1 is a schematic sectional view of a multicolor EP device for compensating misalignment errors associated with a laser beam in the EP device embodying the present disclosure.

Referring now to FIG. 1, there is shown a schematic sectional view of an EP device, such as a multicolor laser printer 100 for compensating misalignment errors associated with a laser beam in the EP device, in accordance with an embodiment of the present disclosure. The present disclosure is explained herein with reference to a multicolor EP device, such as a multicolor laser printer 100 (hereinafter referred to as laser printer 100). However, it will be evident to a person skilled in the art that the teachings of the present disclosure are equally applicable to any other multicolor EP device also.

Laser printer 100 includes laser printheads 102, 104, 106 and 108; a black toner cartridge 110, a magenta toner cartridge 112, a cyan toner cartridge 114, and a yellow toner cartridge 116; photoconductive drums 118, 120, 122, and 124; a transfer belt 126, and a fuser 128. Further, each of laser printheads 102, 104, 106 and 108 scans a respective laser beam, such as a laser beam 130, a laser beam 132, a laser beam 134 and a laser beam 136 in a scan direction across a respective one of photoconductive drums 118, 120, 122, and 124.

Photoconductive drums 118, 120, 122 and 124 may be coated with a photoconductive material. As each photoconductive drum 118, 120, 122 and 124 rotates in a process direction indicated by arrow 138, laser printheads 102, 104, 106, 108 (hereinafter referred to as printhead 102, 104, 106, 108) scans laser beams 130, 132, 134, 136 across photoconductive drums 118, 120, 122, 124, respectively, thereby discharging areas on photoconductive drums 118, 120, 122, 124 to form a latent image on a surface of photoconductive drum 118, 120, 122, 124. The toner from toner cartridges 110, 112, 114, 116 is transferred onto the surface of photoconductive drums 118, 120, 122, 124 which is attracted to the discharged areas of photoconductive drum 118, 120, 122, 124. As photoconductive drums 118, 120, 122, 124 rotates further, the latent image (formed by the toner) is transferred to an outside surface of transfer belt 126. As a print medium, such as a paper sheet travels along a travel path 140, the latent image formed by the toner is transferred from photoconductive drum 118 to the media sheet (not shown) via transfer belt 126.

The media sheet with the latent image thereon, is passed through fuser 128 for affixing the latent image on the media sheet. Fuser 128 may include a fuser heater (not shown) and a pressure roller. Fuser heater provides heat for fusing the toner on the media sheet. Further, the pressure roller applies pressure on the fused toner for affixing the fused toner onto the media sheet.

The heating of fuser 128 results in rise of the temperature of the printhead, including the mountings and the optical components. The rise of temperature of the printhead may have detrimental affects on the quality of print on the media sheet, and may induce registration errors, such as misalignment errors in the EP device. For example, heating of optical components such as lenses may result in expansion thereof, thereby changing refractive indices of the lenses. The change in the refractive indices of the lenses may cause process and/or scan direction drifts in the path of the laser beam. The process and/or scan direction drifts in the path of the laser beam may be detected by determining a start-of-scan (SOS) time and an end-of-scan (EOS) time of the laser beam. Each of laser printheads 102, 104, 106, 108 includes a SOS sensor (not shown) and an EOS sensor (not shown) for determining the SOS time and the EOS time of the laser beam. The difference between the SOS time and the EOS time of the laser beam gives a time-of-flight of the laser beam at any time. Due to heating of the optical components, the time-of-flight of the laser beam may vary from the desired time-of-flight. Accordingly, a difference between a current value of time-of-flight and the desired time-of-flight may facilitate the calibration of the EP device for compensating misalignment errors.

Moreover, due to excessive production of heat by fuser 128, the alignment of the printhead and/or mountings thereof in laser printer 100 may change with time. The change in alignment of the printhead and/or mountings thereof may lead to misalignment errors of the laser beam in laser printer 100. The misalignment errors of the laser beam may be compensated based on a duty cycle of the fuser (hereinafter referred to as fuser duty cycle). The fuser duty cycle may refer to an 'on-time' of fuser 128. Specifically, fuser 128 may include a motor for driving the fuser, such that a 'running time' or an 'on-time' of the motor per minute may be referred to as the fuser duty cycle. In an embodiment of the present disclosure, EP printer 100 may include a memory 142 for storing the values of time-of-flight of laser beam, and the fuser duty cycle. A method for compensating misalignment errors in the EP device, such as laser printer 100 is explained in detail in conjunction with FIG. 2.

Figure 2:
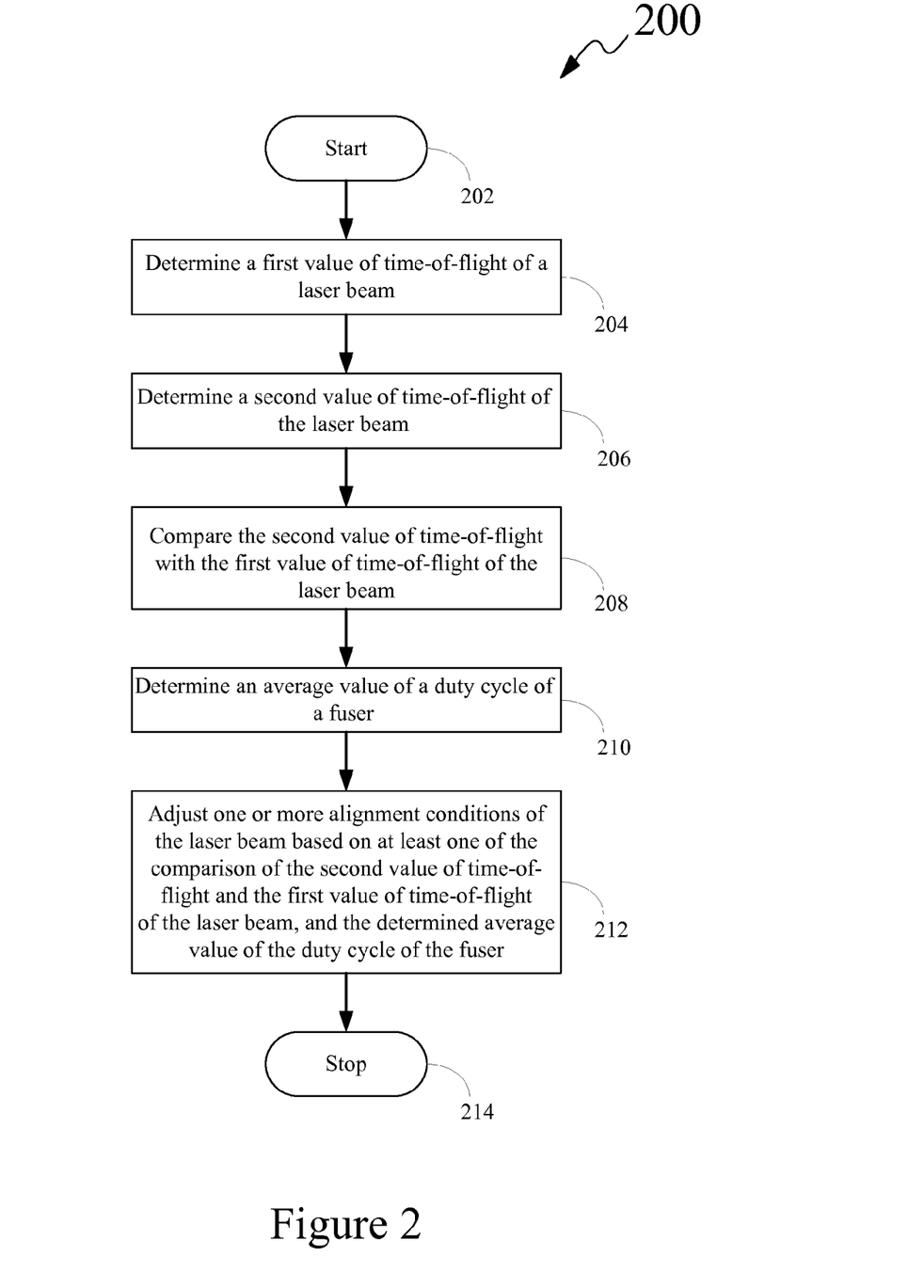
FIG. 2 is a flow diagram illustrating a method for compensating misalignment errors associated with a laser beam in an EP device, in accordance with an embodiment of the present disclosure.

FIG. 2 is a flow diagram illustrating a method 200 for compensating misalignment errors associated with a laser beam in an EP device, such as laser printer 100 embodying the present disclosure. The misalignment errors of the EP device, such as laser printer 100 may be compensated by adjusting one or more alignment condition of laser beams associated with the laser printheads corresponding to each of cyan, magenta, yellow and black colors. The method for compensating misalignment errors in the EP device is explained herein with reference to a single laser beam, such as laser beam 130 for the sake of brevity of the present description. However, it will be evident to a person skilled in the art that the method may be equally applicable for all other laser beams also, such as laser beams 132, 134, and 136. Method 200 for compensating misalignment errors of the laser beam, such as laser beam 130 starts at 202.

At 204, a first value of a time-of-flight of a laser beam, such as laser beam 130 is determined. The time-of-flight of the laser beam may be determined by determining a difference between a first value of the SOS time and a first value of an EOS time of the laser beam. In an embodiment of the present disclosure, the first value of the SOS time and the first value of the EOS time refer to the values of the SOS time and the EOS time of the laser beam at the initial adjustment of the laser beam.

At 206, a second value of the time-of-flight of the laser beam is determined. The second value of the time-of-flight of the laser beam is associated with the current value of the SOS time and the current value of the EOS time of the laser beam.

Accordingly, the second value of the time-of-flight of the laser beam may be determined by determining a difference between the current value of EOS time and the current value of SOS time. In an embodiment of the present disclosure, the current value of the EOS time and the current value of the SOS time are saved in a memory of the EP device.

In an embodiment of the present disclosure, the current values of the SOS time and the EOS time of the laser beam are updated in the memory of the EP device after a second predetermined time interval. Preferably, the second predetermined time interval is one minute. Further, after every second predetermined time interval, a difference of the current values of the SOS time and the EOS time are calculated, and stored in the memory of the EP printer. The difference between the current value of SOS time and the current value of the EOS time gives the second value of the time-of-flight of the laser beam.

At 208, the second value of the time-of-flight of the laser beam is compared with the first value of the time-of-flight. Moreover, a duty cycle of the fuser, such as fuser 128, is monitored. The duty cycle of the fuser may be associated with an 'on-time' of the fuser over a first predetermined interval. In an embodiment of the present disclosure, the first predetermined time interval is one minute.

At 210, an average value of the fuser duty cycle over the first predetermined time interval is determined for a predetermined time period. In an embodiment of the present disclosure, the predetermined time period is two minutes. In another embodiment of the present disclosure, the predetermined time period is five minutes. The average value of the fuser duty cycle over the two minutes time period and the five minutes time period may hereinafter be referred to as two-minute duty cycle and five-minute duty cycle, respectively. The determined average value of the fuser duty cycle, such as, the two-minute fuser duty cycle and the five-minute fuser duty cycle may be stored in the memory of the EP device. In an embodiment of the present disclosure, the determined average value of the fuser duty cycle may be stored in a rolling buffer such that after the predetermined time period, oldest values stored in the rolling buffer may be removed.

At 212, one or more alignment conditions of the laser beam may be adjusted based on at least one of comparison of the second value of time-of-flight and the first value of time-of-flight of the laser beam, and the determined average value of the duty cycle of the fuser. Adjustment of one or more alignment conditions may be done by adjusting alignment of positions of the laser beams corresponding to cyan color, magenta color and yellow color with respect to the position of the laser beam corresponding to black color. Examples of the one or more alignment conditions include adjustment of an initial scan-line of the image to be formed in laser printer 100, adjustment in a fast-scan direction of the laser beam, and a line-length adjustment.

In an embodiment of the present disclosure, a separation of an alignment of laser beams corresponding to various colors, such as yellow, magenta and cyan with respect to an alignment of a laser beam corresponding to black color may be utilized for adjusting one or more alignment conditions of the laser beam. The separation may be determined by means of a sensor, such as a toner patch sensor (not shown). The toner patch sensor may be located close to the transfer belt, such as, transfer belt 126. Further, multiple color targets may be located on transfer belt 126. Each color target may be made up of two line, a color line (such as a yellow line, a magenta line or a cyan line) followed by a black line partially overlaying the color line. A light source (not shown) may be used to illuminate multiple color targets located on transfer belt 126. Transfer belt 126 may travel along a path across the toner patch sensor. The illuminated multiple color targets may reflect light that is measured by the toner patch sensor. The measured light is proportional to an output voltage measured by a photo-detector located within the sensor. The output voltage response may be indicative of an amount of shift in registration or misalignment errors of each of the laser beam in laser printer 100.

In an embodiment of the present disclosure, the shift in registration may be compensated by independently adjusting the positions of each of the sub-images formed corresponding to the cyan color, magenta color and yellow color in the process direction with respect to the image formed corresponding to the black color, in laser printer 100. In another embodiment of the present disclosure, the adjustment may be in the fast-scan direction. As is well know in art, the fast-scan direction is the primary direction of the laser beam and is perpendicular to the process direction. The time for printing sub-images corresponding to the cyan color, magenta color and yellow color may be adjusted independently in the fast scan direction, with respect to the black colored sub-image. In yet another embodiment, the adjustment may be of a line-length corresponding to the cyan, magenta and yellow colors in the fast-scan direction, with respect to the black image. This line-length adjustment may be made by inserting or removing pixels within the scan-line, thereby, increasing or decreasing the length of the cyan, magenta, or yellow image in the fast-scan direction, with respect to the black scan-line. The adjustment of the one or more alignment conditions may compensate for misalignment errors of the laser beam in laser printer 100. Thereafter, method 200 terminates at 214.

In an embodiment of the present disclosure, an initial adjustment of the one or more alignment conditions of the laser beam, such as laser beam 132 (corresponding to cyan color) may be performed prior to determining the first value the time-of-flight of the laser beam at 204. Various embodiments of the present disclosure discussing the adjustment of one or more alignment conditions based on at least one of comparison of the second value of time-of-flight and the first value of time-of-flight of the laser beam, and the determined average value of the duty cycle of the fuser will be explained in conjunction with FIGS. 3, 4, 5 and 6.

In an embodiment of the present disclosure, the one or more alignment conditions of the laser beam are adjusted following a Power-on-reset (POR) of the EP device. A method 300 for compensating misalignment errors of the laser beam in the EP device is explained further with respect to FIG. 3. In the present embodiment, the misalignment errors of the laser beam may be compensated based on a time-of-flight of the laser beam.

Figure 3:
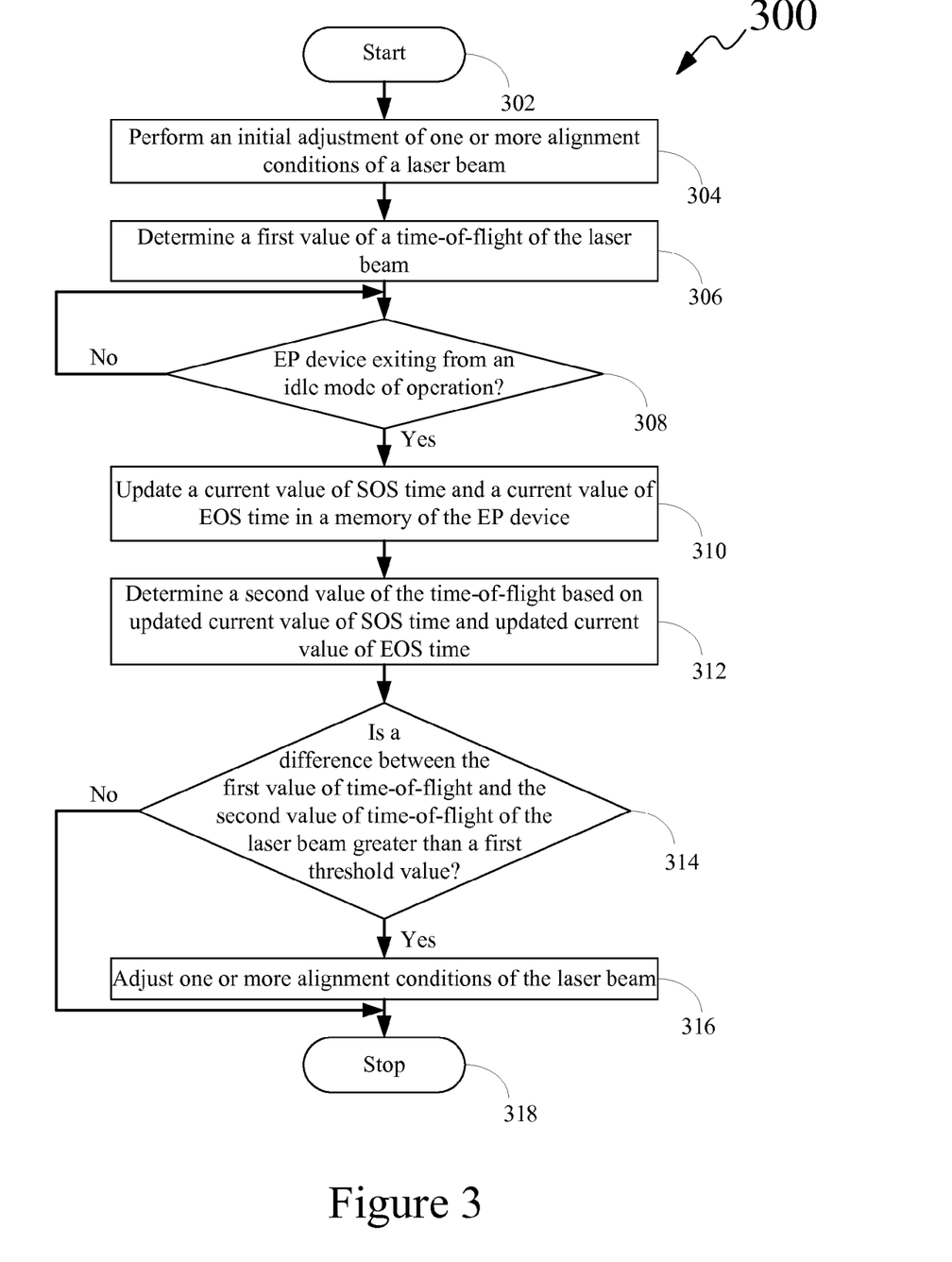
FIG. 3 is a flow diagram illustrating a method for compensating misalignment errors associated with a laser beam in an EP device, in accordance with another embodiment of the present disclosure.

Method 300 starts at 302 when a POR of the EP device is detected. As is evident to a person skilled in the art that for determining the SOS time and the EOS time of the laser beam, the EP printer should be in a run-in mode prior to performing any printing operation. Accordingly, an initial adjustment of one or more alignment conditions of a laser beam, such as, beam 130 is performed at 304. Initial adjustments of the one or more alignment conditions may be performed by any method know in the art. In an embodiment of the present disclosure, the initial adjustment of the one or more alignment conditions may be adjusted by means of a toner patch sensor to detect a voltage response of colored toner patches (cyan, yellow or magenta) with respect to the black patch.

A first value of a time-of-flight of the laser beam may be determined at 306. The first value of the time-of-flight of the laser beam may be determined by determining a difference between a first value of the EOS time and a first vale of the SOS time of the laser beam. The first values of the EOS time and the SOS time are associated with values thereof at the initial adjustment of the one or more alignment conditions of the laser beam. In an embodiment of the present disclosure an immediately preceding adjustment of the one or more alignment conditions may be referred to as initial adjustment of the one or more alignment conditions.

At 308, a determination of mode of operation of the EP device is made until it is determined that the EP device is exiting an idle mode of operation. When it is determined at 308 that the EP device is exiting the idle mode of operation, a current value of the SOS time and the EOS time is updated in a memory of the EP device, at 310. Specifically, in this embodiment of the present disclosure, the values of the SOS time and the EOS time is updated upon determining that the EP device is exiting from the idle mode. A second value of the time-of-flight of the laser beam is determined based on the updated current value of the SOS time and the updated current value of the EOS time, at 312. Specifically, a difference between the updated current value of the SOS time and the updated current value of the EOS time gives the second value of the time-of-flight of the laser beam.

At 314, it is determined whether a difference between the second value of the time-of-flight and the first value of the time-of-flight of the laser beam is greater than a first threshold value. In an embodiment of the present disclosure, the first threshold value for the laser beam corresponding to cyan color is 10,000 counts. In another embodiment of the present disclosure, the first threshold value for the laser beam corresponding to magenta color is 20,000 counts.

If at 314, the difference between the second value of the time-of-flight and the first value of the time-of-flight of the laser beam is determined to be greater than the first threshold value, the one or more alignment conditions of the laser beam are adjusted at 316. The one or more alignment conditions of the laser beam may be adjusted by any method known in the art. In an embodiment of the present disclosure, the one or more alignment conditions of the laser beam may be adjusted by utilizing a toner patch sensor as already explained with reference to FIG. 2. If it is determined at 314 that the difference between the second value of the time-of-flight and the first value of the time-of-flight of the laser beam is not greater than the first threshold value, the method 300 terminates at 318.

Figure 4:
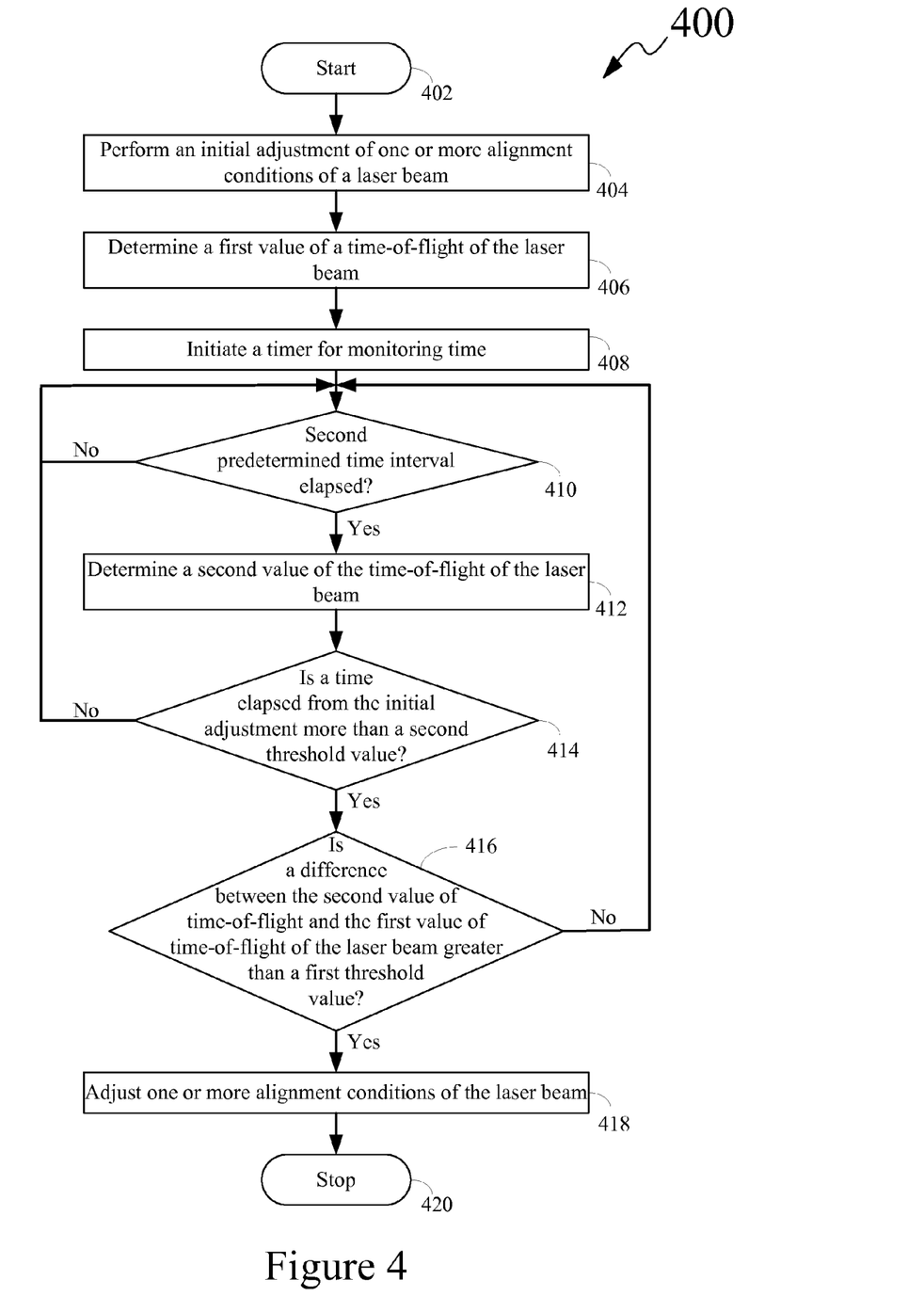
FIG. 4 is a flow diagram illustrating a method for compensating misalignment errors associated with a laser beam in an EP device, in accordance with yet another embodiment of the present disclosure.

FIG. 4 is a flow diagram illustrating a method 400 for compensating the misalignment errors associated with a laser beam in an EP device, in accordance with yet another embodiment of the present disclosure. In this embodiment of the present disclosure, the misalignment errors are compensated based upon the determination of the time-of-flight of the laser beam as well as a time elapsed since an initial adjustment of the one or more alignment conditions of the laser beam.

Method 400 starts at 402. An initial adjustment of one or more alignment conditions of a laser beam, such as, beam 130 is performed at 404. A first value of a time-of-flight of the laser beam is determined at 406. As mentioned earlier, the first value of the time of flight may be determined based upon a first value of the SOS time and a first value of EOS time of the laser beam. At 408, a timer is initiated for monitoring time. Specifically, the timer records the time elapsed since the initial adjustment of the one or more alignment conditions. In an embodiment of the present disclosure, the initial adjustment may refer to adjustment of one or more alignment condition prior to a current adjustment of the one or more alignment conditions. At 410, it is determined whether a second predetermined time interval has elapsed since the initial adjustment of the one or more alignment conditions. In an embodiment of the present disclosure, the second predetermined time interval is one minute. If it is determined at 410 that the second predetermined time interval has elapsed since the initial adjustment of the one or more alignment conditions, a current value of the SOS time and the EOS time is updated in a memory of the EP device. Specifically, in this embodiment of the present disclosure, the values of the SOS time and the EOS time is updated after every second predetermined time interval. The updated current values of the SOS time and the EOS time may be stored in the memory of the EP device. A second value of the time-of-flight of the laser beam is determined based on the updated current values of SOS time and the updated current value of the EOS time, at 412.

At 414, it is determined whether a time elapsed since the initial adjustment of the one or more alignment conditions of the laser beam (hereinafter referred to as a second predetermined time interval) till the determination of the second value of the time-of-flight of the laser beam is greater than a second threshold value. In an embodiment of the present disclosure, the second predetermined time interval is 600 seconds. If at 414, it is determined that the second predetermined time interval has not elapsed, it is again determined at 410 whether a subsequent second predetermined time interval has elapsed at 410. However, if it is determined at 414 that the second predetermined time interval has elapsed since the initial adjustment of the one or more alignment conditions of the laser beam, it is determined at 416 whether a difference between the second value of the time-of-flight and the first value of the time-of-flight of the laser beam is greater than a first threshold value. In an embodiment of the present disclosure, the first threshold value for the laser beam corresponding to cyan color is 10,000 counts. In another embodiment of the present disclosure, the first threshold value for the laser beam corresponding to magenta color is 20,000 counts.

If it is determined at 416 that the difference between the second value of the time-of-flight and the first value of the time-of-flight of the laser beam is not greater than a first threshold value, then it is again determined at 410, whether the second predetermined time interval has elapsed. However, if at 416, the difference between the second value of the time-of-flight and the first value of the time-of-flight of the laser beam is determined to be greater than the first threshold value, the one or more alignment conditions of the laser beam are adjusted at 418. Thereafter, method 400 terminates at 420.

Figure 5:
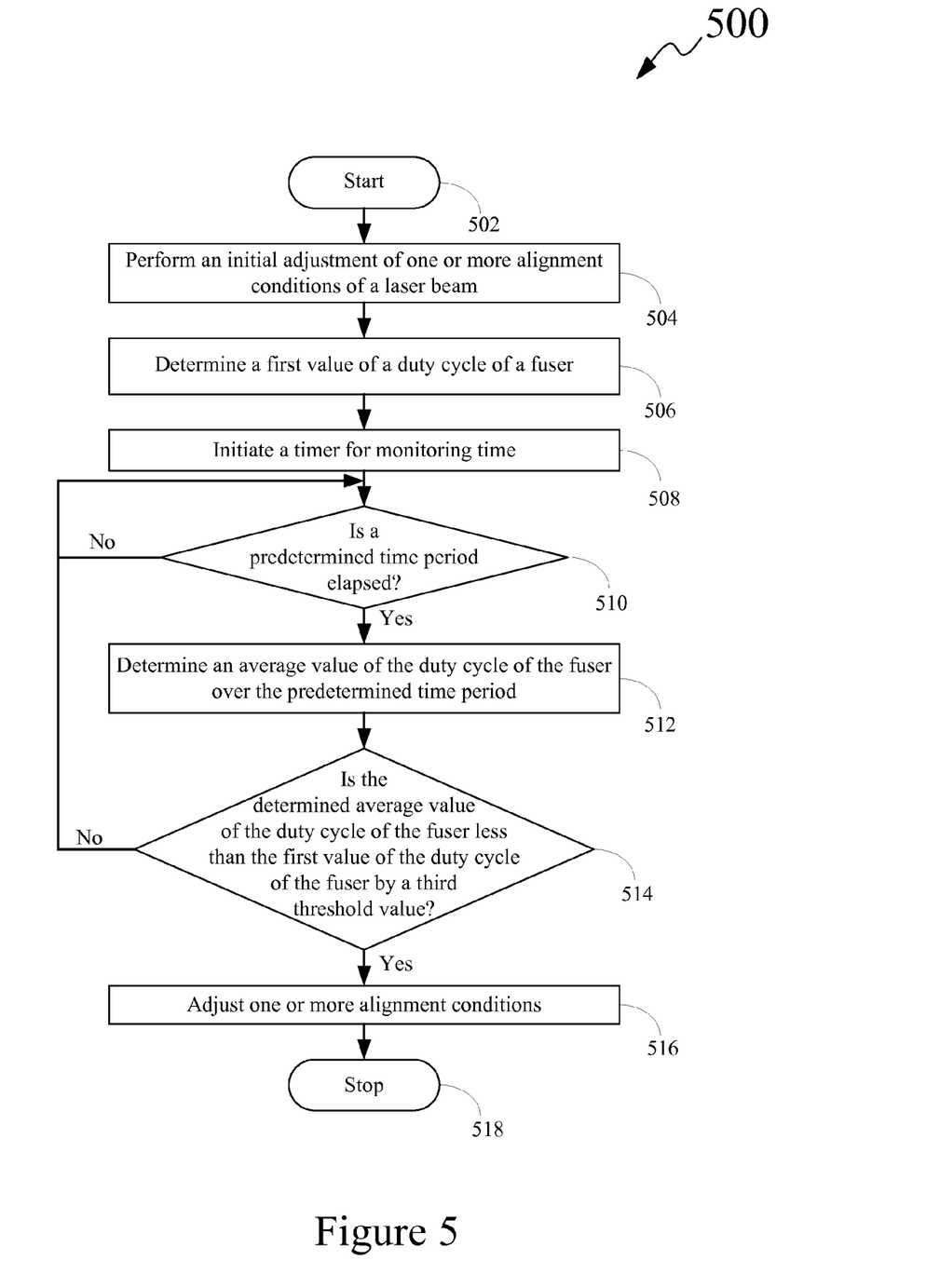
FIG. 5 is a flow diagram illustrating a method for compensating misalignment errors associated with a laser beam in an EP device, in accordance with still another embodiment of the present disclosure.

In still another embodiment of the present disclosure, the misalignment errors in the EP device are compensated based on a determination of the fuser duty cycle. A flow diagram illustrating a method 500 for compensation of misalignment errors associated with the laser beam in an EP device, such as EP printer 100 according to the present embodiment is depicted in FIG. 5.

Method 500 begins at 502 upon detecting a POR of the EP device. Upon detecting the POR of the EP device, an initial adjustment of one or more alignment conditions of a laser beam, such as laser beam 130, is performed at 504. In an embodiment of the present disclosure, the initial adjustment may also refer to any adjustment of the one or more alignment conditions immediately preceding the current adjustment of the one or more alignment conditions.

At 506, a first value of a duty cycle of a fuser over a first predetermined time interval is determined. The first value of the duty cycle of the fuser refers to the value of the duty cycle of the fuser at the initial adjustment of the one or more alignment conditions. Moreover, the fuser duty cycle may refer to an 'on-time' of fuser 128. Specifically, fuser 128 may include a motor for driving the fuser, such that a 'running time' or an 'on-time' of the motor per minute may be referred to as the fuser duty cycle. A timer is initiated for monitoring time at 508. The timer records the time elapsed since the initial adjustment of the one or more alignment conditions. At 510, it is determined whether a predetermined time period is elapsed since the initial adjustment of the one or more alignment conditions. In the present embodiment, the time elapsed is determined by the timer. In an embodiment of the present disclosure, the predetermined time period is two minutes. In another embodiment of the present disclosure, the predetermined time period is five minutes. The determination of elapse of the predetermined time period is performed until the predetermined time period is elapsed. If it is determined at 510, that the predetermined time period has elapsed since the initial adjustment of the one or more alignment conditions, an average value of the fuser duty cycle over the predetermined time period is determined, at 512. Further, the determined average value of the fuser duty cycle may be updated in a memory of the EP device. In an embodiment of the present disclosure, the determined average value of the fuser duty cycle for the predetermined time period is updated in a rolling buffer in the EP device after a predetermined time interval, such as after every one minute. As such, the rolling buffer is initiated and the value of the fuser duty cycle is updated in the rolling buffer as a percentage of 'on-time' over each minute.

At 514, it is determined whether the difference between a determined average value of the fuser duty cycle and the first value of the fuser duty cycle for the predetermined time period is less than a third threshold value. In an embodiment of the present disclosure, the third threshold value for a two-minute fuser duty cycle is 50 percent. Specifically, at 514 it is determined whether a drop in the value of two-minute duty cycle since the initial adjustment of the one or more alignment conditions is more than 50 percent. Alternatively, in another embodiment of the present disclosure, it is determined at 514 whether a drop in the value of five-minute duty cycle since the initial adjustment of the one or more alignment conditions is more than 40 percent. In an embodiment of the present disclosure, the determined average values of fuser duty cycle stored in the rolling buffer may be updated after, say about every ten minutes such that the earliest stored values may be removed first.

If at 514, it is determined that the difference between the determined average value of the fuser duty cycle and the first value of the fuser duty cycle is not less than the third threshold value, it is further determined at 510 whether the predetermined time period has elapsed. However, if it is determined at 514 that the difference between the determined average value of the fuser duty cycle and the first value of the fuser duty cycle is less than the third threshold value, then the one or more alignment conditions of the laser beam are adjusted at 516. The one or more alignment conditions may be adjusted by any method known in the art. Thereafter, method 500 terminates at 518.

Figure 6:
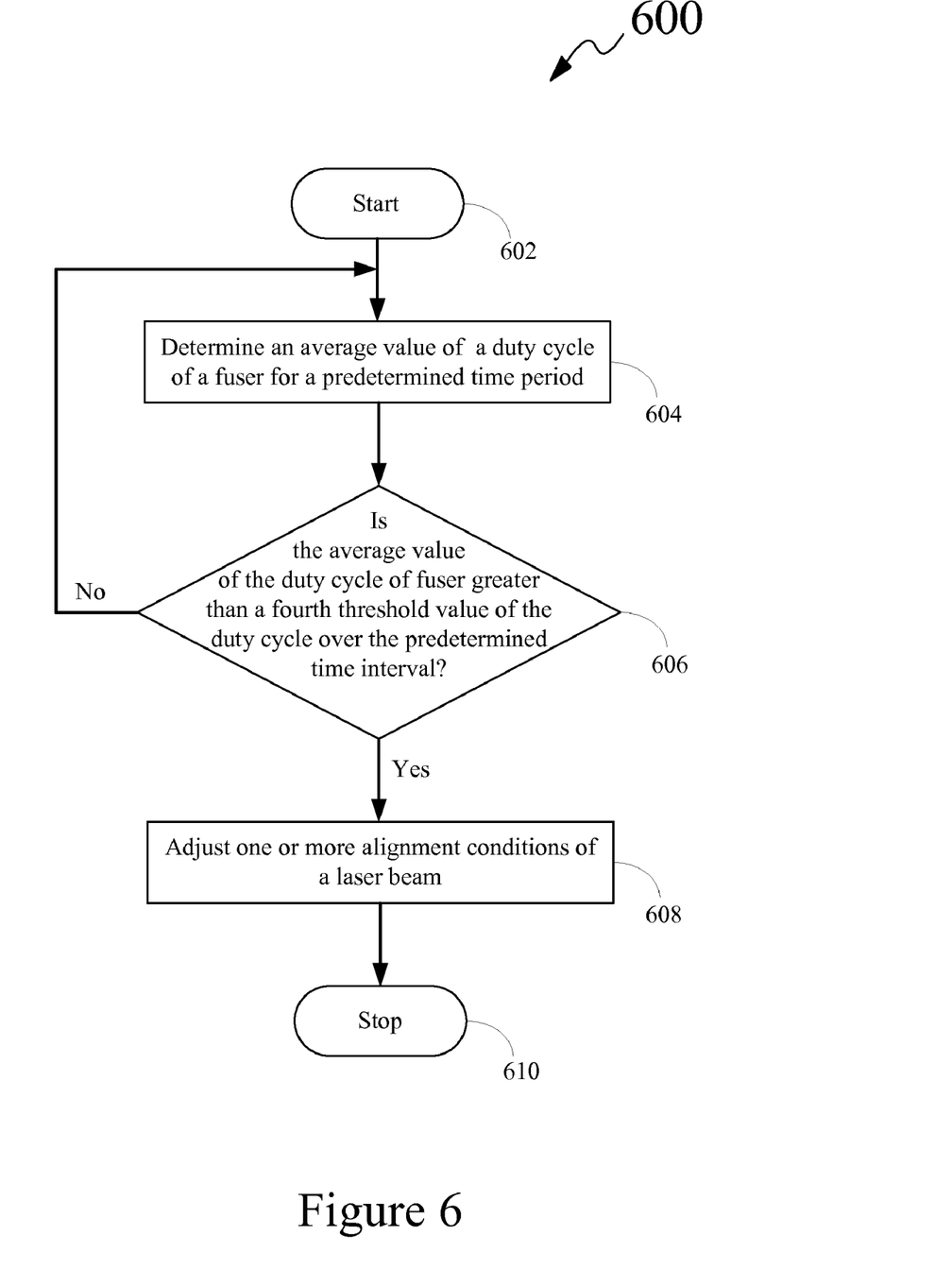
FIG. 6 is a flow diagram illustrating a method for compensating misalignment errors associated with a laser beam in an EP device, in accordance with still another embodiment of the present disclosure.

Referring to FIG. 6, a flow diagram for a method 600 for compensating misalignment errors associated with a laser beam in an EP device is illustrated, in accordance with still another embodiment of the present disclosure. In the present embodiment, the one or more alignment conditions of the laser beam, such as laser beam 130, are adjusted based on the determined average value of the duty cycle of the fuser. The adjustment of the one or more alignment conditions of the laser beam compensates for the misalignment errors of the laser beam in the EP device. Method 600 starts at 602. At 604, an average value of the fuser duty cycle for a predetermined time period is determined. In an embodiment of the present disclosure, the predetermined time period is two minutes. In another embodiment of the present disclosure, the predetermined time period is five minutes.

At 606, it is determined whether the determined average value of the fuser duty cycle over the predetermined time period is greater than a fourth threshold value of the duty cycle over the predetermined time period. For a two-minute fuser duty cycle, the value of fourth threshold value may be 0.8. Further, for a five-minute fuser duty cycle, the value of fourth threshold value may be 0.6.

If the determined average value of the fuser duty cycle is not greater than the fourth threshold value of the duty cycle over the predetermined time period at 606, the average value of the fuser duty cycle over the first predetermined time interval is again determined at 604.

If the determined average value of the fuser duty cycle over the predetermined time period is greater than the fourth threshold value of the duty cycle for the predetermined time period at 606, one or more alignment conditions of the laser beam are adjusted at 608. In an embodiment of the present disclosure, if it is determined that the fuser duty cycle is greater than 80 percent duty cycle over any two-minute time period, the one or more alignment conditions of the laser beam are adjusted. In another embodiment of the present disclosure, if it is determined that the fuser duty cycle is greater than 60 percent duty cycle over any five-minute time period, the one or more alignment conditions of the laser beam are adjusted. Adjusting the one or more alignment conditions compensates for the misalignment errors in the EP device. The method terminates at 610.

In still another embodiment of the present disclosure, the method for compensating one or more alignment conditions of the laser beam is based on determination of a mode of operation of the EP device. Specifically, upon exiting an idle mode of operation of the EP device, an amount of time spent in the idle mode of operation (hereinafter referred to as idle mode time) may be determined. Further, a first value of the duty cycle of the fuser may be determined. The first value of the duty cycle of the fuser refers to the value of the duty cycle of the fuser at the initial adjustment of the one or more alignment conditions of the laser beam. In an embodiment of the present disclosure, the first value of the duty cycle of the fuser may be retrieved from the memory of the EP printer. If it is determined that idle mode time is greater than a fifth threshold value, and the first value of the duty cycle of the fuser is greater than a sixth threshold value, the one or more alignment conditions of the laser beam are adjusted. In an embodiment of the present disclosure, the fifth threshold value is five minutes. In an embodiment of the present disclosure, the sixth threshold value is 45 percent. The one or more alignment conditions of the laser beam may be adjusted by a method known in art.

In an embodiment of the present disclosure, the adjustment of the one or more alignment conditions may be disabled based on a user input. For example, after performing printing operation using EP printer 100, the user may request calibration of the EP printer for compensating the one or more alignment conditions of the laser beams. In another embodiment of the present disclosure, the adjusting of the one or more alignment conditions of the laser beam may be disabled based on a determination of a jam condition. The adjustment of the one or more alignment conditions may be disabled based on numerous other factors in the EP device, such as while already adjusting one or more alignment conditions in the EP device, upon determining that a request is pending for adjusting one or more alignment conditions, upon detecting that the adjustment of one or more alignment conditions is disabled in the EP device, upon detecting the adjustment of one or more alignment conditions being perform within last two minutes, and the like.

The various embodiments of the method for compensating the misalignment errors in the EP device, as described herein, may be implemented into hardware and/or software of the EP device. The said compensation may be achieved by adjusting one or more alignment conditions of the laser beams in the EP device. In an embodiment of the present disclosure, a request for adjustment of the one or more alignment conditions may be made when the EP device, such as EP printer is operating in an idle mode. Thereafter, upon receiving a request for performing a printing operation, the current value of the time-of-flight of the laser beam may be determined, and compared with the first value thereof. Further, a duty cycle of the fuser may be determined. Based on said comparison of the current value and the first value of the time-of-flight, and said determination of the fuser duty cycle, the one or more alignment conditions of the laser beam may be adjusted. However, upon comparison of the current value and the first value of the time-of-flight, and determination of the duty cycle of the fuser, if it is determined that the alignment of the one or more alignment conditions is not required, the said adjustment may be disabled. The disabling of the adjustment of the one or more alignment conditions may immediately be followed by performing the printing operation, thereby saving time. Accordingly, the disclosed method may avoid any delay in performing the printing operation in the EP device.

The adjustment of the one or more alignment condition may be performed by merging said adjustment with other printing operations in the EP device. Specifically, the EP printer may include a normal adjustment mode and a coarse adjustment mode, such that the adjustment of the one or more alignment conditions may begin with a normal adjustment mode. However, in case the adjustment is disabled in the normal adjustment mode, the coarse adjustment mode may be followed. During said disablement of the normal adjustment mode, information may be lined-up for performing a printing operation thereof. The printing operation of the information may be performed, and thereafter the coarse adjustment mode may be merged with the normal adjustment mode.

As described above, the embodiments of the present disclosure may be embodied in the form of a computer program product for compensating misalignment errors of a laser beam in an EP device, such as EP printer 100 explained in conjunction with FIGS. 1, 2, 3, 4, 5, and 6. Embodiments of the present disclosure may also be embodied in the form of program module containing instructions embodied in tangible media, such as floppy diskettes, CD-ROMs, hard drives, or any other computer-readable storage medium, wherein, when the program module is loaded into and executed by a computer, the computer becomes an apparatus for practicing the present disclosure. The computer program product comprises a program module comprising instructions for determining a first value of a time-of-flight of the laser beam. The first value of time-of-flight is associated with a first value of a start-of-scan (SOS) time and a first value of an end-of-scan (EOS) time of the laser beam. Further, the instructions include instructions for determining a second value of the time-of-flight of the laser beam. The second value of the time-of-flight is associated with a current value of the SOS time and a current value of the EOS time of the laser beam.

The instructions also include instructions for comparing the second value of the time-of-flight of the laser beam with the first value of the time-of-flight of the laser beam. Moreover, the instructions include instructions for monitoring a duty cycle of a fuser of the EP device. The duty cycle is associated with an 'on-time' of the fuser over a first predetermined time interval. Thereafter, the instructions include instructions for determining an average value of the duty cycle of the fuser for a predetermined time period. Also, the instructions include instructions for adjusting one or more alignment conditions of the laser beam based on at least one of the comparison of the second value of the time-of-flight and the first value of the time-of-flight of the laser beam, and the determined average value of the duty cycle of the fuser.

It will be apparent to a person skilled in the art that the present disclosure as described above, may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented on a general-purpose microprocessor, the computer program code segments configure the microprocessor to create specific logic circuits.

The foregoing description of several methods and an embodiment of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

What is claimed is:

1. A method for compensating misalignment errors associated with a laser beam in an electrophotographic (EP) device, the method comprising:
   determining a first value of a time-of-flight of the laser beam, the first value of the time-of-flight being associated between a first value of a start-of-scan (SOS) time and a first value of an end-of-scan (EOS) time of the laser beam;
   determining a second value of the time-of-flight of the laser beam, the second value of the time-of-flight being associated with a current value of the SOS time and a current value of the EOS time of the laser beam;
   comparing the second value of the time-of-flight of the laser beam with the first value of the time-of-flight of the laser beam;
   monitoring a duty cycle of a fuser of the EP device, the duty cycle associated with an 'on-time' of the fuser over a first predetermined time interval;
   determining an average value of the duty cycle of the fuser for a second predetermined time period; and
   adjusting one or more alignment conditions of the laser beam based on at least one of the comparison of the second value of the time-of-flight and the first value of the time-of-flight of the laser beam, and the determined average value of the duty cycle of the fuser,
   wherein the adjusting of the one or more alignment conditions of the laser beam compensates for the misalignment errors of the laser beam in the EP device.

2. The method of claim 1 further comprising performing an initial adjustment of the one or more alignment conditions of the laser beam prior to the determination of the first value of the time-of-flight of the laser beam.

3. The method of claim 2 wherein the initial adjustment of the one or more alignment conditions is performed during or upon exit from a power-on-reset mode of the EP device.

4. The method of claim 2 further comprising determining a time elapsed from the initial adjustment of the one or more alignment conditions of the laser beam until determining the second value of the time-of-flight of the laser beam.

5. The method of claim 1 further comprising
updating the second value of the time-of-flight after a third predetermined time interval, and
determining a difference between the updated second value of the time-of-flight of the laser beam and the first value of the time-of-flight of the laser beam.

6. The method of claim 1 wherein the one or more alignment conditions of the laser beam are adjusted following the EP device exiting from an idle mode of operation and the determined difference between the second value of the time-of-flight of the laser beam and the first value of the time-of-flight is more than a first threshold value, the laser beam being associated with one of a cyan color, and a magenta color.

7. The method of claim 1 further comprising:
performing an initial adjustment of the one or more alignment conditions of the laser beam prior to the determination of the first value of the time-of-flight of the laser beam; and
determining a time elapsed from the initial adjustment of the one or more alignment conditions of the laser beam until determining the second value of the time-of-flight of the laser beam, wherein the one or more alignment conditions of the laser beam are adjusted upon determining the determined time elapsed being more than a first threshold value, and the difference between the second value of the time-of-flight of the laser beam and the first value of the time-of-flight being more than a second threshold value, the laser beam being associated with one of a cyan color and a magenta color.

8. The method of claim 1 further comprising performing an initial adjustment of the one or more alignment conditions of the laser beam prior to the determination of the first value of the time-of-flight of the laser beam, wherein the one or more alignment conditions of the laser beam are adjusted upon determining the average value of the duty cycle of the fuser for the second predetermined time period being lesser than a first value of the duty cycle of the fuser by a first threshold value, the first value of the duty cycle of the fuser being associated with the initial adjustment of the one or more alignment conditions.

9. The method of claim 1 wherein the one or more alignment conditions of the laser beam are adjusted upon determining the average value of the duty cycle of the fuser being greater than a first threshold value of the duty cycle over the first predetermined time period.

10. The method of claim 1 further comprising performing an initial adjustment of the one or more alignment conditions of the laser beam prior to the determination of the first value of the time-of-flight of the laser beam, wherein the one or more alignment conditions of the laser beam are adjusted following exiting an idle mode of operation when
an amount of time in the idle mode of operation is greater than a first threshold value,
and the determined average value of the duty cycle of the fuser at the initial adjustment of the one or more alignment conditions of the laser beam is greater than a second threshold value.

11. The method of claim 1 further comprising disabling the adjusting of the one or more alignment conditions of the laser beam based on one of user input and an occurrence of a media sheet jam condition.

12. A computer program product embodied on a computer readable medium for compensating misalignment errors associated with a laser beam in an electrophotographic (EP) device, the computer program product comprising a program module having instructions for:
determining an average value of the duty cycle of a fuser of the EP device over a predetermined time period; and
adjusting one or more alignment conditions of the laser beam based on the determined average value of the duty cycle of the fuser, wherein the adjusting of the one or more alignment conditions of the laser beam compensates for the misalignment errors of the laser beam in the EP device.

13. The computer program product of claim 12, further comprising instructions for
determining a first value of a time-of-flight of the laser beam, the first value of a time-of-flight being associated between the first value of a start-of-scan (SOS) time and a first value of an end-of-scan (EOS) time of the laser beam;
determining a second value of the time-of-flight of the laser beam, the second value of the time-of-flight being associated with a current value of the SOS time and a current value of the EOS time of the laser beam;
comparing the second value of the time-of-flight of the laser beam with the first value of the time-of-flight of the laser beam; and
wherein the adjusting comprises adjusting the one or more alignment conditions of the laser beam based upon at least one of the determined average value of the duty cycle and the comparison.

14. The computer program product of claim 13 further comprising instructions for performing an initial adjustment of the one or more alignment conditions of the laser beam prior to the determination of the first value of the time-of-flight of the laser beam.

15. The computer program product of claim 14 further comprising instructions for determining whether an operating mode of the EP device is a power-on-reset mode, wherein the initial adjustment is performed upon an affirmative determination that the operating mode of the EP device is the power-on-reset mode.

16. The computer program product of claim 13 further comprising instructions for updating the second value of the time-of-flight after a second predetermined time period, and determining a difference between the updated second value of the time-of-flight of the laser beam and the first value of the time-of-flight of the laser beam.

17. The computer program product of claim 13 wherein the instructions for adjusting one or more alignment conditions of the laser beam comprises instructions for determining whether the EP device is exiting from an idle mode of operation and determining whether the determined difference between the second value of the time-of-flight of the laser beam and the first value of the time-of-flight is more than a first threshold value.

18. The computer program product of claim 12, wherein the instructions for adjusting one or more alignment conditions of the laser beam comprises instructions for determining the average value of the duty cycle of the fuser over the first predetermined time period being lesser than a first value of the duty cycle of the fuser by a first threshold value, the first value of the duty cycle of the fuser being associated with an initial adjustment of the one or more alignment conditions.

19. The computer program product of claim 12 wherein the instructions for adjusting one or more alignment conditions of the laser beam comprises instruction for determining whether the average value of the duty cycle of the fuser is greater than a first threshold value of the duty cycle over the first predetermined time period.

20. The computer program product of claim 12, wherein the instructions for adjusting one or more alignment conditions of the laser beam comprises instructions for adjusting the one or more alignment conditions of the laser beam upon exiting an idle mode of operation and upon determining an amount of time the EP device was in the idle mode of operation is greater than a first threshold value.

* * * * *